United States Patent [19]
Fukuda

[11] Patent Number: 5,493,347
[45] Date of Patent: Feb. 20, 1996

[54] TELEVISION AND VIDEO TAPE RECORDER COMPOUND SET

[75] Inventor: Yutaka Fukuda, Daito, Japan

[73] Assignee: Funai Electric Company Limited, Osaka, Japan

[21] Appl. No.: 203,743

[22] Filed: Mar. 1, 1994

Related U.S. Application Data

[63] Continuation of Ser. No. 681,010, Apr. 5, 1991, abandoned.

[30] Foreign Application Priority Data

Jul. 19, 1990 [JP] Japan ................... 2-77376 U

[51] Int. Cl.⁶ ............................. H04N 5/76; H04N 5/64
[52] U.S. Cl. .................. 348/836; 360/33.1; 348/843; 358/335
[58] Field of Search ................... 348/787, 789, 348/836, 843, 838; 358/335; 360/33.1; 312/7.2, 323.1, 323.2, 406, 406.1; 455/347, 348; D14/125, 126, 129, 135, 162, 168; H04N 5/76, 5/78, 5/64

[56] References Cited

U.S. PATENT DOCUMENTS

| | | | |
|---|---|---|---|
| 4,755,881 | 7/1988 | Bartlett | 358/254 |
| 4,809,089 | 2/1989 | Richie | 358/254 |
| 4,831,449 | 5/1989 | Kimura | 358/254 |
| 4,947,457 | 8/1990 | Shin | 455/348 |
| 5,041,944 | 8/1991 | Campisi | 358/254 |
| 5,107,404 | 4/1992 | Tam | 455/348 |
| 5,119,204 | 6/1992 | Hashimoto et al. | 358/254 |

*Primary Examiner*—Thai Q. Tran
*Attorney, Agent, or Firm*—Harold Gell

[57] ABSTRACT

A combined television-video tape recorder in which the VTR is immovably fixed to the bottom of a cabinet by the coupling of its projections and a pair of rails and the VTR's printed circuit board, on which many micro-switches are arranged, is stably fixed to the front face of the cabinet, where console buttons are provided, with screws inserted from the front so that the console buttons can accurately be brought into contact with the micro-switches respectively by a press of a finger tip.

5 Claims, 6 Drawing Sheets

TELEVISION AND VIDEO TAPE RECORDER COMPOUND SET

This application is a continuation of application Ser. No. 07/681,010, filed Apr. 5, 1991, now abandoned.

FIELD OF THE INVENTION

This invention relates to a television (TV) and video tape recorder (VTR) compound set; more specifically, a set in which a VTR is directly and stably fixed to the front inner face of a front half cabinet with screws inserted from forward.

BACKGROUND OF THE INVENTION

So far there have been TV and VTR compound sets. However, in conventional compound sets, the VTR is fixed to a cabinet with screws inserted from the bottom and/or both sides of the cabinet. Therefore, when the VTR is fixed, micro-switches on a printed circuit board on the front face of the VTR are not always placed in a desired close position to the console buttons on the front face of the cabinet. This tends to cause malfunctions due to their separation after long use even if they are closely set the first time.

SUMMARY OF THE INVENTING

According to the invention, a television and video tape recorder compound set is assembled by inserting a video tape recorder between a pair of rails which are provided on the bottom of a front half cabinet from backward and directly fixing the video tape recorder to the front inner face of the front half cabinet. The video tape recorder is inserted from the back and fixed to the front inner face of the front half cabinet with screws inserted from the front.

OBJECTIVES OF THE INVENTION

Simply and unmovably fixing a VTR in a given position in a TV cabinet without the need for special elements and without increasing parts to fix the VTR to simplify the assembling process of a TV and VTR in the workshop.

Directly fixing the printed circuit board on the front face of a VTR to the front inner face of the front half cabinet of a TV so the micro-switches and the console buttons are always brought into contact with each other when any of the console buttons are pressed by a finger tip.

Eliminating malfunctions due to micro-switch/console button separation which occur in conventional TV-VTR compound sets where the VTR is fixed to the front half cabinet with screws from both sides and/or bottom instead of from the front like in the invention.

DESCRIPTION OF THE DRAWING

The drawings provided herein show an embodiment of the invention, in which.

PREFERRED EMBODIMENT OF THE INVENTION

Figure 2:
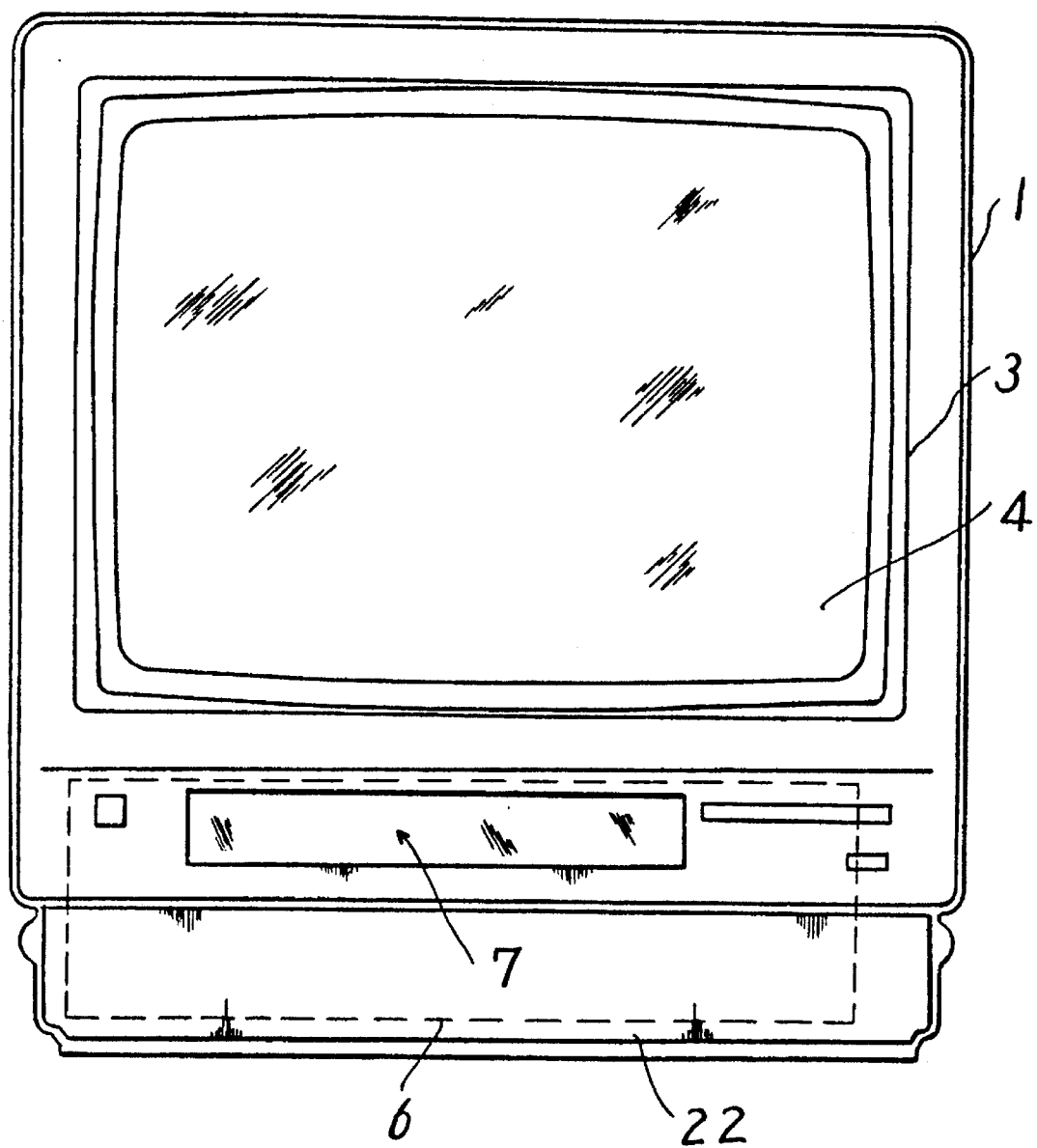
FIG. 2 is a front view of the set according to the invention.
Figure 3:
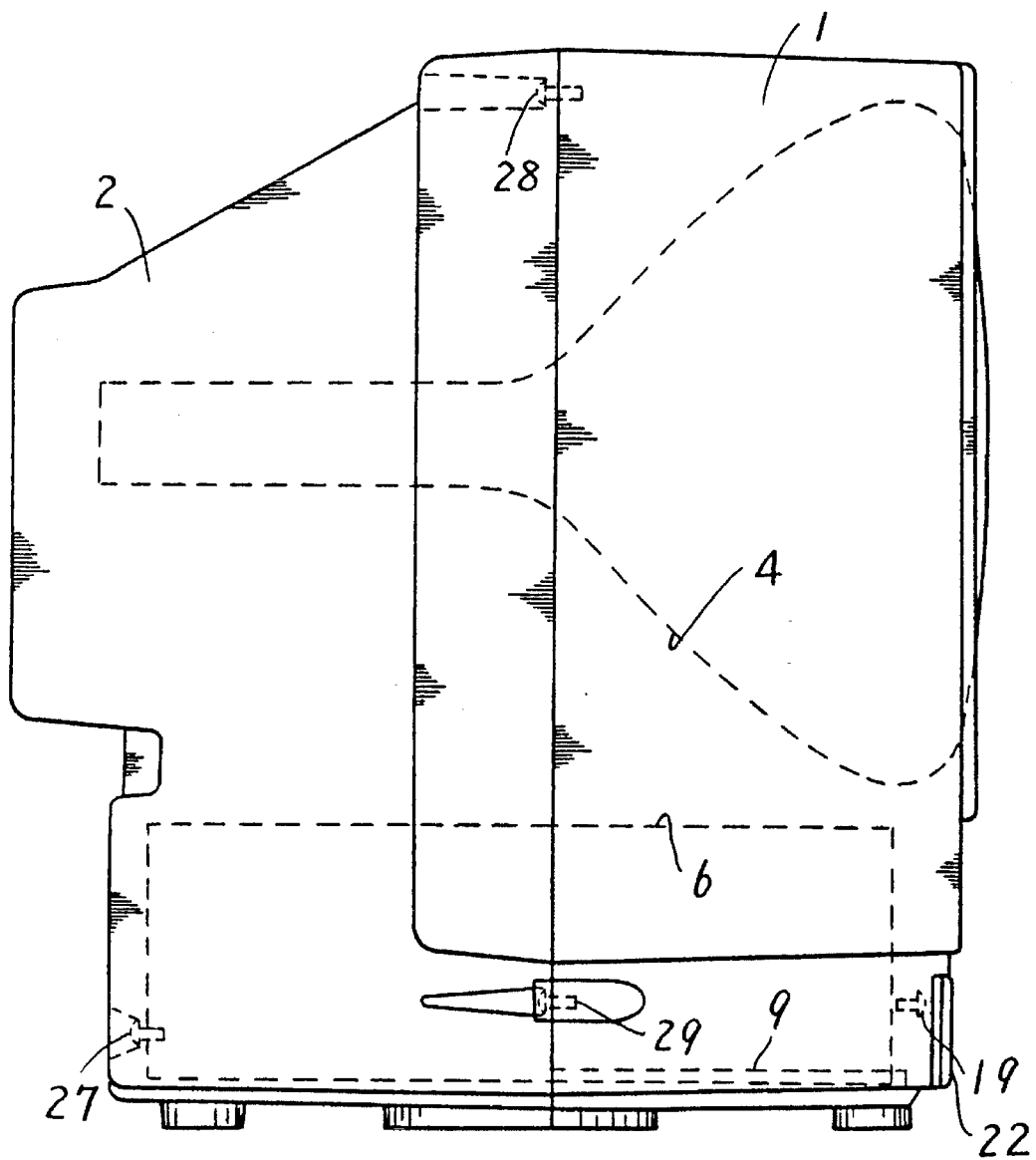
FIG. 3 is a side view of the set according to the invention, in which the contours of a Braun tube and VTR are shown by using dotted lines.

As clearly shown in FIG. 3, a TV and VTR compound set assembled according to the invention is covered with front 1 and rear 2 half cabinets, generally made of plastic. As shown in FIG. 2, a Braun tube 4 is put in a window frame 3 on the front face of the front half cabinet 1 and firmly held with it. A VTR 6 including a picture reproducing head 5 (FIG. 4) is placed on the bottom of the front half cabinet. A video cassette tape is loaded in or taken out of the VTR 6 by way of a laterally long window 7.

Figure 4:
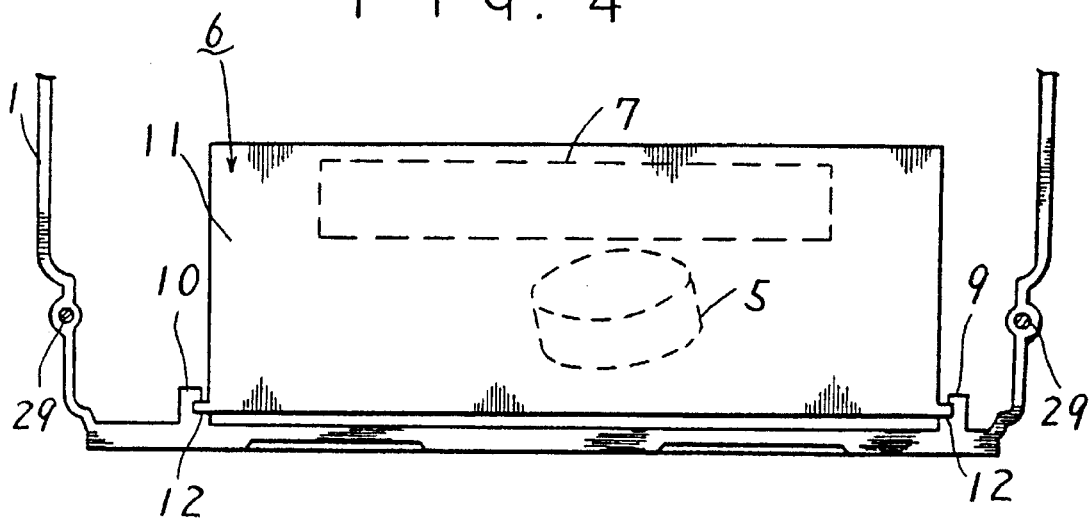
FIG. 4 is a rear view of the set according to the invention.

As shown in FIG. 4, a pair of L-shaped plastic rails 9, 10 inwardly opposed to each other are molded in one with the front half cabinet 1 so that projections 12, 12 on the lower edges of the VTR's rectangular plastic chassis 11 can be slid in between them from the back and firmly received so as not to move.

Figure 1:
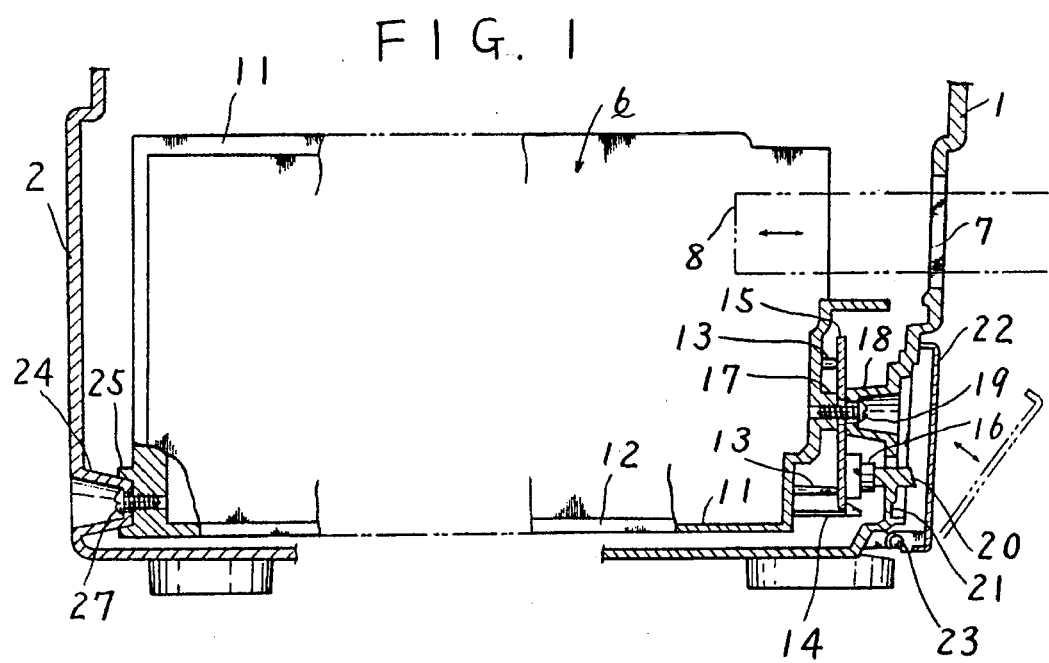
FIG. 1 is a partially cutaway side view of the essential part of a TV and VTR set assembled according to the invention.
Figure 5:
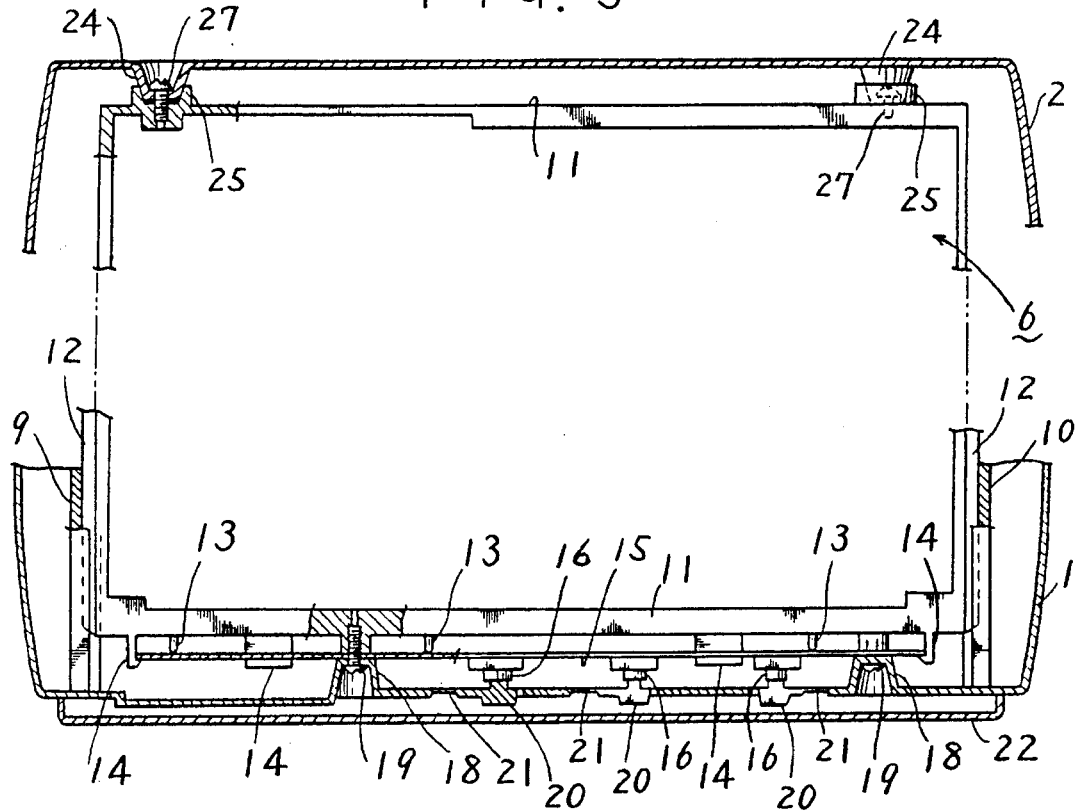
FIG. 5 is a cutaway plan view of the set according to the invention.
Figure 6:
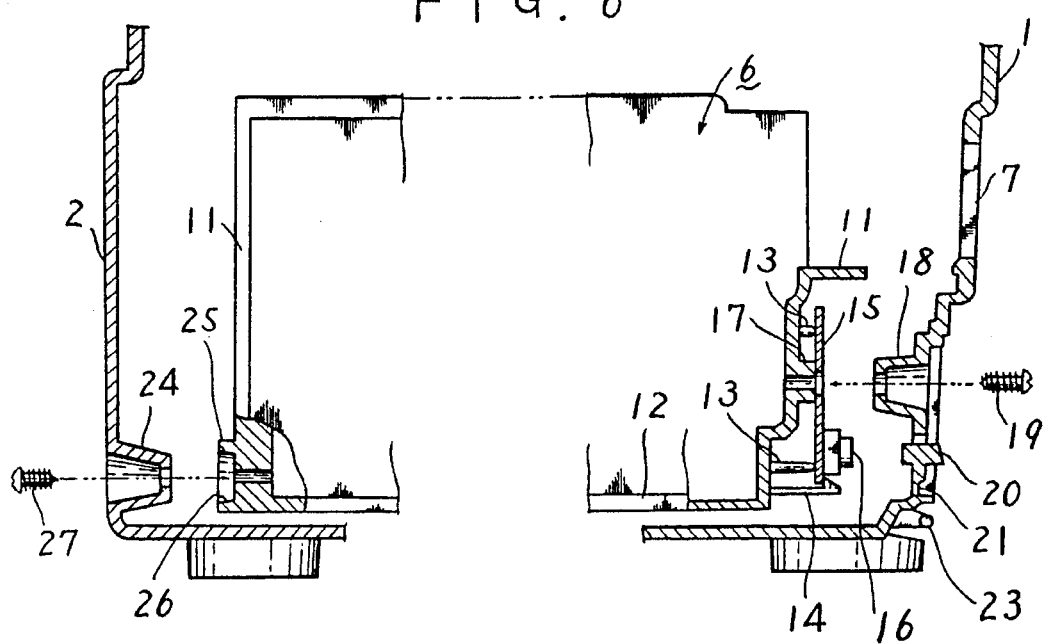
FIG. 6 is an exploded view of FIG. 1.

As shown in FIGS. 1, 5 and 6, projections 13, 13, for supporting the back of a circuit printed board 15, hooks 14, 14, for holding the circuit printed board 15 at both its ends, and bosses 17, 17 are provided to the front face of the chassis 11, by which the circuit printed board 15 provided with a plurality of micro-switches 16, 16,... is firmly mounted on the front face of the chassis 11. Moreover conical fixtures 18, 18 are provided on the front inner face of the front cabinet 1 so that they may accurately oppose the bosses 17, 17 one to one whereby the printed circuit board 15 is firmly secured to the front inner face of the front cabinet 1 by means of screws 19, 19 inserted from the front and passing through the fixtures 18, 18, the printed circuit board 15 and the bosses 17, 17.

A plurality of console buttons 20, each having a hinge 21, for use in selecting broadcasting channels, switching recording to playing back and vice versa and so forth, are positioned so as to accurately oppose to the micro-switches 16 one to one. They are molded as part of the front half cabinet 1 so that they can be elastically pressed in the cabinet or popped out therefrom by the action of their hinges 21 to allow the micro-switches 16 to be turned on or off by a finger tip pressing from outside. A lid 22, which hinges on an axis 23, is adapted so as to cover all of the console buttons 20 and the screws 19, 19 on the front face of the cabinet.

Conical fixtures 24, 24 are provided on the back inner face of the rear half cabinet 2. They are molded in one with the rear half cabinet. Bosses 25, 25 are provided to on the back face of the chassis 11. A hole 26 in the bosses 25, 25 is designed to receive the fixtures 24, 24. Therefore, the chassis 11 and the rear half cabinet 2 can be joined firmly together with screws 27, 27 inserted from the back when the bosses 25, 25 and the fixtures 24, 24 are coupled with each other. The tops of the conical fixtures 24, 24 are put in the holes 26, 26 of the bosses 25, 25 respectively, to effectively alleviate shocks which would damage the screws 27, 27.

According to the invention stated above, the VTR's chassis 11 is provided with the printed circuit board 15 on its front face firmly fixed to the front inner face of the front half cabinet 1 by sliding in its projections 12, 12 between the rails 9, 10 and then securing the conical fixtures 18, 18 to the bosses 17, 17 with screws 19, 19 inserted from the front. Likewise, the rear half cabinet 2 is firmly attached to the VTR's chassis 11 by the coupling of the conical fixtures 24, 24 and the bosses 25, 25 with screws 27, 27 inserted from the back and to the front half cabinet 1 with screws 28, 29 similarly inserted from the back as shown in FIG. 3.

In this way the VTR 6 is stably fixed in the cabinet by means of the rails 9, 10 so as not to move up and down or left and right. Moreover, since the printed circuit board 15 on the front face of the VTR 6 is directly fixed to the front inner face of the front half cabinet 1, the micro-switches 16, 16,.. and the console buttons 20, 20,. are securely brought into contact with each other when any of the console buttons are pressed by a finger tip and they will not cause malfunctions due to their separation, which occurs in conventional TV-VTR compound sets of which the VTR is fixed to the front half cabinet with screws from both sides and/or bottom, not from the front as in this invention.

What is claimed is:

1. A combined television and video tape recorder, including a television receiver and video tape recorder contained within a common cabinet, comprising:

a molded unitary cabinet front half configured to form a bottom, a front panel including pressure responsive areas supported by elastic segments of said front panel and a pair of inwardly opposed inverted "L" shaped rails;

said video tape recorder comprising a plurality of micro-switches and a chassis including projections positioned and dimensioned to slide within channels created between said "L" shaped rails and said bottom of said cabinet front half;

bosses projecting from the front of said video tape recorder chassis;

conical fixtures projecting inwardly from the back of said front panel and positioned there on to be in alignment with said bosses when said projections are within said channels; and said conical fixtures including fastener means centering bores orientated to permit said chassis to be secured to said cabinet front half when said projections are in said channels by said fastener means passing through said bores and into said bosses whereby said micro-switches are positioned so as to be responsive to said pressure responsive areas of said front panel.

2. An apparatus as defined in claim 1, further comprising:

a cabinet back half including conical fixtures projecting toward said cabinet front half, said conical fixtures including centering bores whereby said fastener means pass therethrough and secure said cabinet back half to said video tape recorder chassis and said cabinet front half.

3. An apparatus as defined in claim 1, comprising; a printed circuit board;

stand off means projecting from said video tape recorder chassis for supporting said printed circuit board in an approximately parallel orientation with said front panel.

4. An apparatus, comprising:

a combined television and video tape recorder;

a cabinet front half comprising a bottom, a front panel including flexible operator depressible areas and a pair of inwardly opposed inverted "L" shaped rails molded as a unitary structure;

a video tape recorder chassis including projections positioned and dimensioned to slide within channels created between said "L" shaped rails and said bottom of said cabinet front half;

fastener means receiving boss means projecting from the front of said video tape recorder chassis; conical fixtures projecting inwardly from the back of said front panel and positioned there on to be in alignment with said boss means when said projections are within said channels;

said fastener means centering bores in said conical fixtures orientated to permit said chassis to be secured to said cabinet front half when said projections are in said channels by said fastener means passing through said bores and into said fastener means receiving boss means; a video tape recorder printed circuit board secured between said conical fixtures and said bosses by said fastener means;

stand off means projecting from said video tape recorder chassis for supporting said printed circuit board in an approximately parallel orientation with said front panel; and a plurality of micro-switch means mounted on said video tape recorder printed circuit board positioned to be operationally adjacent to said flexible operator depressible areas when said video tape recorder printed circuit means is secured in said chassis front half.

5. An apparatus as defined in claim 4, further comprising:

a cabinet back half including conical fixtures projecting toward said cabinet front half, said conical fixtures including centering bores whereby said fastener means pass therethrough and secure said cabinet back half to said video tape recorder chassis and said cabinet front half.

* * * * *